United States Patent [19]

Fink, Jr. et al.

[11] Patent Number: 5,365,973
[45] Date of Patent: Nov. 22, 1994

[54] BREAK-AWAY CONCENTRIC HOSE COUPLING

[75] Inventors: Arthur C. Fink, Jr., Lonedell; Thomas O. Mitchell, Maryland Heights, both of Mo.

[73] Assignee: Husky Corporation, Pacific, Mo.

[21] Appl. No.: 140,525

[22] Filed: Oct. 25, 1993

[51] Int. Cl.5 ............................................. F16L 37/28
[52] U.S. Cl. ......................... 137/614.04; 137/614.05; 137/68.1
[58] Field of Search ............ 137/614, 614.03, 614.04, 137/614.05, 594, 68.1; 141/285, 302

[56] References Cited

U.S. PATENT DOCUMENTS

| 4,763,683 | 8/1988 | Carmack | 137/614.04 |
| 4,827,977 | 5/1989 | Fink, Jr. | 137/614.04 |
| 5,014,743 | 5/1991 | Makishima | 137/614.03 |
| 5,135,029 | 8/1992 | Anderson et al. | 137/614.04 |
| 5,141,014 | 8/1992 | Poli et al. | 137/614.04 |
| 5,209,262 | 5/1993 | Carow et al. | 137/614.04 |

Primary Examiner—Martin P. Schwadron
Assistant Examiner—Kevin L. Lee
Attorney, Agent, or Firm—Paul M. Denk

[57] ABSTRACT

A break away hose coupling for use in conjunction with a vapor recovery nozzle and for application within a fuel line, that prevents untimely decoupling, that only decouples upon the exertion of a pre-determined amount of tension, while preventing unnecessary leakage of fuel and vapors, while being fully reconnectable. The coupling includes a pair of fittings, for connecting to the fuel line, a sleeve for housing the fittings, and each fitting incorporating a check valve to provide for closure of the fluid flow passage and closure of the vapor flow passage when decoupling occurs, a fluid chamber providing for flow of fluid and a vapor return passage, internal of the fluid flow passage, allowing vapor recovery in a concentric line. The device is pressure compensated to eliminate the effects of line shock.

14 Claims, 2 Drawing Sheets

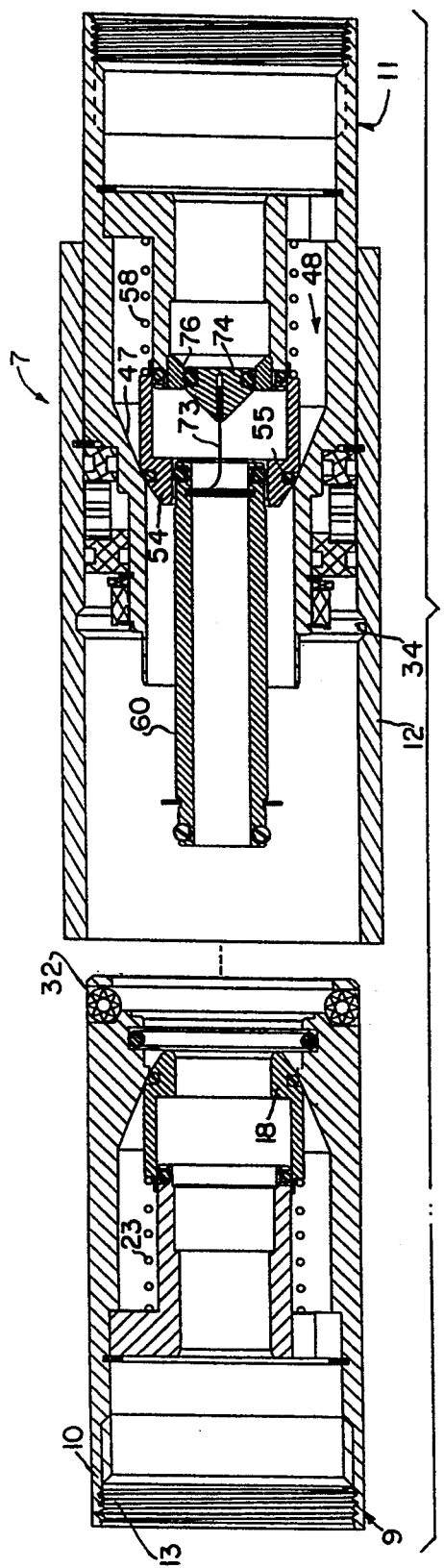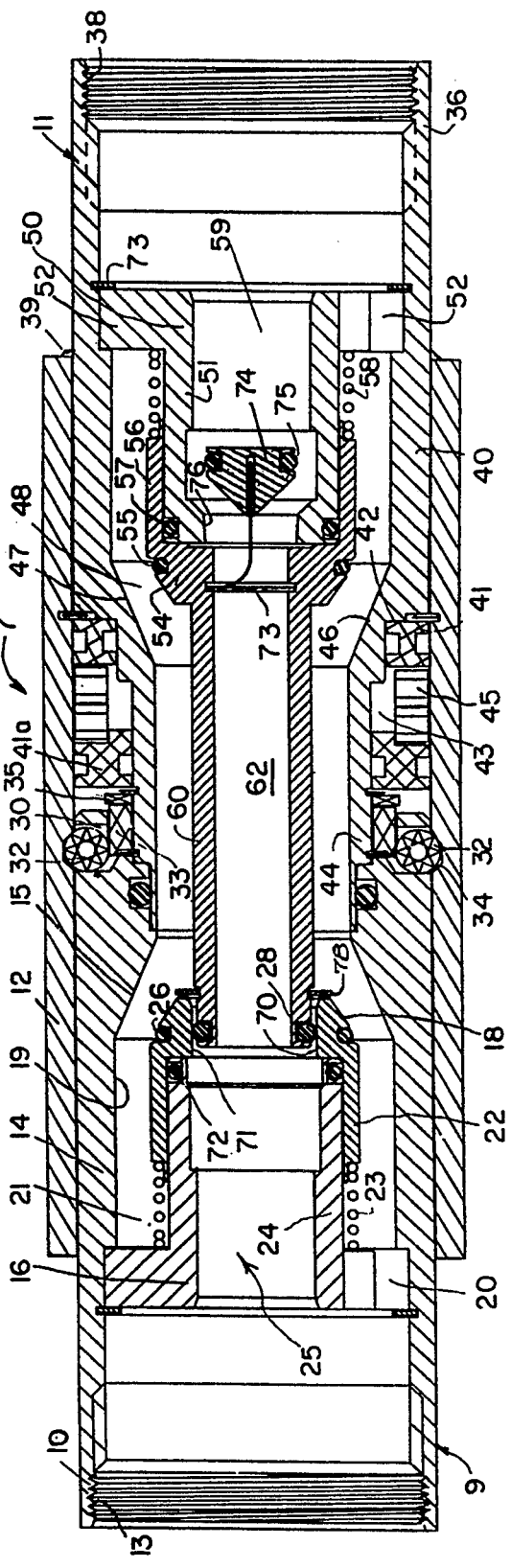

BREAK-AWAY CONCENTRIC HOSE COUPLING

REFERENCE TO RELATED APPLICATION

The subject matter of this application is related to the subject matter of the patent of Arthur C. Fink, Jr. pertaining to break-away hose coupling, now U.S. Pat. No. 4,827,977, and owned by common assignee.

BACKGROUND OF THE INVENTION

This invention relates generally to a means for preventing and stopping fluid passage through a fluid flow line, such as a gasoline line used in connection with a fuel dispensing system at a service station, as when the line is severed.

Particularly, a service station gas pump hose can be severed or ripped and a loss of fluid and vapors may be encountered, for example, when a driver of a vehicle drives off with the gasoline nozzle inadvertently remaining within the fuel tank of his automobile. This usually occurs in the self-service station. This invention is especially useful when applied in a fuel line functioning as a check valve to prevent fuel flow under particular adverse conditions.

There are an infinite number of valve means in the prior art that furnish shut-off of fluid flow, and more particularly, such mechanisms normally are utilized in fuel lines where fuel may be dispensed, and generally in those situations when the line comprises a fuel line leading from a gasoline dispenser to the nozzle. One example is U.S. Pat. No. 4,666,888 to the aforementioned Arthur Fink.

Another example can be seen in U.S. Pat. No. 2,642,297 to Hanna, which discloses a break-away coupling that responds to tension in the line which is mounted and is held together through a combination of male and female connectors and detents that provide bearing engagement between the two components. In addition, the U.S. Pat. Nos. 4,617,975 and 4,691,941 to Rabushka disclose various types of tension actuated couplers for the use in the line that deliver gasoline to a vehicle from a gas pump. The problems that have been encountered with the style of coupler as disclosed in these prior patents is that they have a tendency to leak. When internal pressure is exerted within the fuel line, such as may occur when the pumping of the gasoline is being performed, excessive pressures may build-up within the fuel line and particularly at the location of the uncoupler resulting in leakage. In some cases, the pressure, known as line shock, has the tendency to force the uncoupling device to prematurely come apart. This generally occurs in the type of break-away coupling that is constructed having unequal internal surfaces that cause greater fluid forces to be applied in one direction upon one part of the coupling than is exerted upon the other.

When spontaneous high pressures or line shocks are encountered, the pressure exerted upon one component of the coupling device in one direction, is substantially different from the fluid pressure that may be exerted in the other direction on the other component of the coupling device. This disparity in pressure has a tendency to force the coupler to prematurely separate, in an untimely and perhaps dangerous fashion. This can and has ocurred particularly where the fluid pressure generated within the hose may undertake a phenomenom that is equivalent to what is known in the art as "water hammer". Water Hammer is caused by the pumping of fuel through the flow line cresting pressure spikes that build up rather significantly and substantially, throughout the hose, momentarily when the flow is suddenly stopped. For example, when the fuel tank is full and the nozzle shut off, the spike in high pressure causes leakage in the couplers. This frequently occurs in the field, and, on occasion, as previously explained, untimely separation of the uncoupler has happened.

Another problem with the couplers known to the art is that they do not necessarily provide for a vapor passage wherein vapors are captured and returned to the system so as to prevent escape of vapors into the environment. Furthermore, those couplers known in the art and which do provide vapor passageways are usually external to the fluid flow path. They cannot be used on a concentric flow line wherein the vapor path in the line is internal to the fluid flow line.

Examples of other U.S. Patents that show various related uncoupling devices include U.S. Pat. No. 4,449,545, disclosing a poppet valve having a connical surface that is disposed for seating upon a valve seat, when breakage occurs between the various body components making up the plug and socket of the shown valve.

There are a great variety of other types of these hose couplers, employed in the art, as can be seen in U.S. Pat. No. 2,777,716 to Gray, showing a socket-type hose coupler with reciprocating detent. Another form of quick disconnect coupler and safety check valve is shown in U.S. Pat. No. 4,060,219, to Crawford.

In addition to the foregoing, the patent to Shames, U.S. Pat. No. 4,070,003, also discloses a coupler with automatic shut-off, but as can be seen, the sealing means provided therein is of substantial size and causes significant disruption to the normal flow of fluid through the coupler.

Another type of valve assembly is shown in U.S. Pat. No. 4,307,744 to Morrison. An additional form of breakaway safety valve is shown in U.S. Pat. No. 4,064,889, to Gayle, wherein there is an incorporated ball valve which prevents the discharge of gasoline vapors in the event that a break occurs.

Other patents showing decoupling devices, for use in flow lines, of various types, are shown in U.S. Pat. No. 2,906,280 to Mount, entitled "Break-Away Coupling". U.S. Pat. No. 3,741,521 to Tatsuno shows a pipe coupling with safety valve. U.S. Pat. No. 1,410,218 to Pamer, discloses a gas valve. U.S. Pat. No. 2,777,716, to Gray discloses a socket-type hose coupler with reciprocating detent. U.S. Pat. No. 2,898,926 to Tsiguloff shows a safety disconnect valve for use in conjunction with fuel dispensing. U.S. Pat. No. 3,085,589 to Sands, discloses a safety valve. Another patent to Sands, U.S. Pat. No. 3,122,162, shows a flow control device. The patent to Shames, U.S. Pat. No. 4,070,003, shows a coupler with automatic shut-off. The patent to Allread, U.S. Pat. No. 4,119,111, discloses a frangible hose end fitting. The patent to Sands, U.S. Pat. No. 3,085,589 shows a safety valve. The patent to Johnson, U.S. Pat. No. 2,048,388, discloses another form of safety device, for use in conjunction with fuel dispensing. The patent to Scheiwer, U.S. Pat. No. 2,135,221, discloses a coupling used within a flow line. The patent to Clark, U.S. Pat. No. 2,452,430 shows another form of quick disconnect coupling. The patent to Yonkers, U.S. Pat. No. 2,455,544, shows a related type of pipe coupling. The patent to Scheiwer, U.S. Pat. No. 2,536,702, discloses a coupling for use within a flow line, and incorporating ball-type coupling members. Paskar, U.S. Pat. No. 2,599,935 discloses a hydraulic line coupling. Wurmser, U.S. Pat. No. 2,631,872, discloses a quick coupling device for flow lines. Clark, in his U.S. Pat. No. 2,860,893, shows a ball detent type coupling with break-away feature. Burning, U.S. Pat. No. 3,317,220, shows a resealable fluid coupling. Bolton, Jr., in U.S. Pat. No. 3,334,860, discloses a fluid coupling. Shendur, U.S. Pat. No. 3,715,099, discloses a valved quick-disconnect coupling. Silvana, U.S. Pat. No. 3,918,679, discloses a universal coupling. Taylor, in his U.S. Pat. No. 4,098,438, discloses a gasoline spill prevention system and apparatus. The patent to Morrison, U.S. Pat. No. 4,240,228, shows a pressure balanced fluid coupling. the patent to Parrish, U.S. Pat. No. 4,392,513, shows a quick disconnect safety coupling. The patent to Scheiwer, U.S. Pat. No. 2,536,702 discloses another form of coupling. A similar type of coupling assembly is shown in the patent Norton, et al, U.S. Pat. No. 3,836,114. Livingston, in U.S. Pat. No. 3,138,393, shows a coupling for substantially axialy fixed conduits. Burning, U.S. Pat. No. 3,317,220, shows a releasable fluid coupling. Wurmser in U.S. Pat. No. 2,631,872, discloses a quick coupling. Paskar, in U.S. Pat. No. 2,599,935, shows a hydraulic line coupling. Clark, et al in U.S. Pat. No. 2,452,430, shows a quick disconnect coupling. Clark, in U.S. Pat. No. 2,860,893, shows a ball detent type coupling with break-away features. Morrison, in U.S. Pat. No. 4,124,228, shows a pressure balance coupling.

These are examples of various prior art break-away coupling devices, primarily for use within a fluid flow line, and in certain instances are of the break-away type. None of the aforementioned, with the exception of U.S. Pat. No. 4,827,972, to Fink, a co-inventor of the present invention, discloses a break-away hose coupling that eliminates the effects of line shock or "water hammer".

Moreover, the couplings disclosed in the prior art show a vapor path internal of the fuel path. For example, in U.S. Pat. No. 4,827,977, to Fink, the break-away hose coupling is designed with a vapor path external to the fuel path.

SUMMARY OF THE INVENTION

It is therefore, the principle object of this invention to provide a break-away hose coupling having a vapor path internal of the fuel path to be used with a concentric hose, what generally is referred to as the European-style vapor recovery hose where the vapor return passage is internal of the fuel passage.

Another object of this invention is to provide a break-away hose coupling in which the internal pressures generated within the coupling during its functioning within a fuel line have no effect upon the coupling, and as a result, prevents undesirable fuel leakage or untimely separation.

Another object of this invention is to provide a coupling device so connected to eliminate the negative effects of line shock.

Still another object of this invention is to provide a decoupling device that is designed to pull apart under a pre-determined force, the force being uneffected by any of the internal fluid pressures that may be generated within the coupling during its routine use.

Another object of this invention is to provide a break-away coupling wherein its operative components may be preset for disengagement of its separable porportions upon exertion of a pre-determined, externally applied tension force, and once separated, its shut-off valves effectively seal off further passage of fluid and vapors in either direction or from either hose section, in addition, the break-away coupling can be easily reassembled, with a minimum of force, upon a single reinsertion of one component into another.

These and objects will become more apparent to those skilled in the art upon reviewing the summary of this invention and upon undertaking a study of the description of its preferred embodiment, in view of the drawings.

Briefly stated, this invention comtemplates the formation of a break-away coupling, of the type that may be used within a fluid flow line, and can be used in what is referred to as a concentric or European-style vapor recovery hose where the vapor return passage is internal of the fluid passage, incorporating the use of a spider that has fins or legs to allow fuel to pass between the fins, an opening that receives the vapor return passage of the hose, which is connected to the vapor passages of check valves, the check valves being sealed to their respective spiders to prevent leakage. Upon decoupling, the coupling separates and the check valves seat against the fittings, sealing off the flow of fluid; ports in the vapor passage come to rest against sealing means, thus sealing all vapor passage. The fluid flow passage, eliminates the effects of line shock, and prevents premature decoupling; the fitting is fully reconnectable. This is generally the principle designed into the current invention. The configuration of its various components, the design of the fluid and vapor passages, and shut-off valves, as well as the purposes of their functions, will be better understood upon the provision of the description of the preferred embodiment.

BRIEF DESCRIPTION OF THE DRAWINGS

FIG. 2 is a cross-sectional view of the coupling device of the present invention taken along line 2—2 of FIG. 1; and, FIG. 3 is a cross-sectional view similar to that of FIG. 2 showing the hose coupling in a decoupled relationship.

DESCRIPTION OF THE PREFERRED EMBODIMENT

Figure 1:
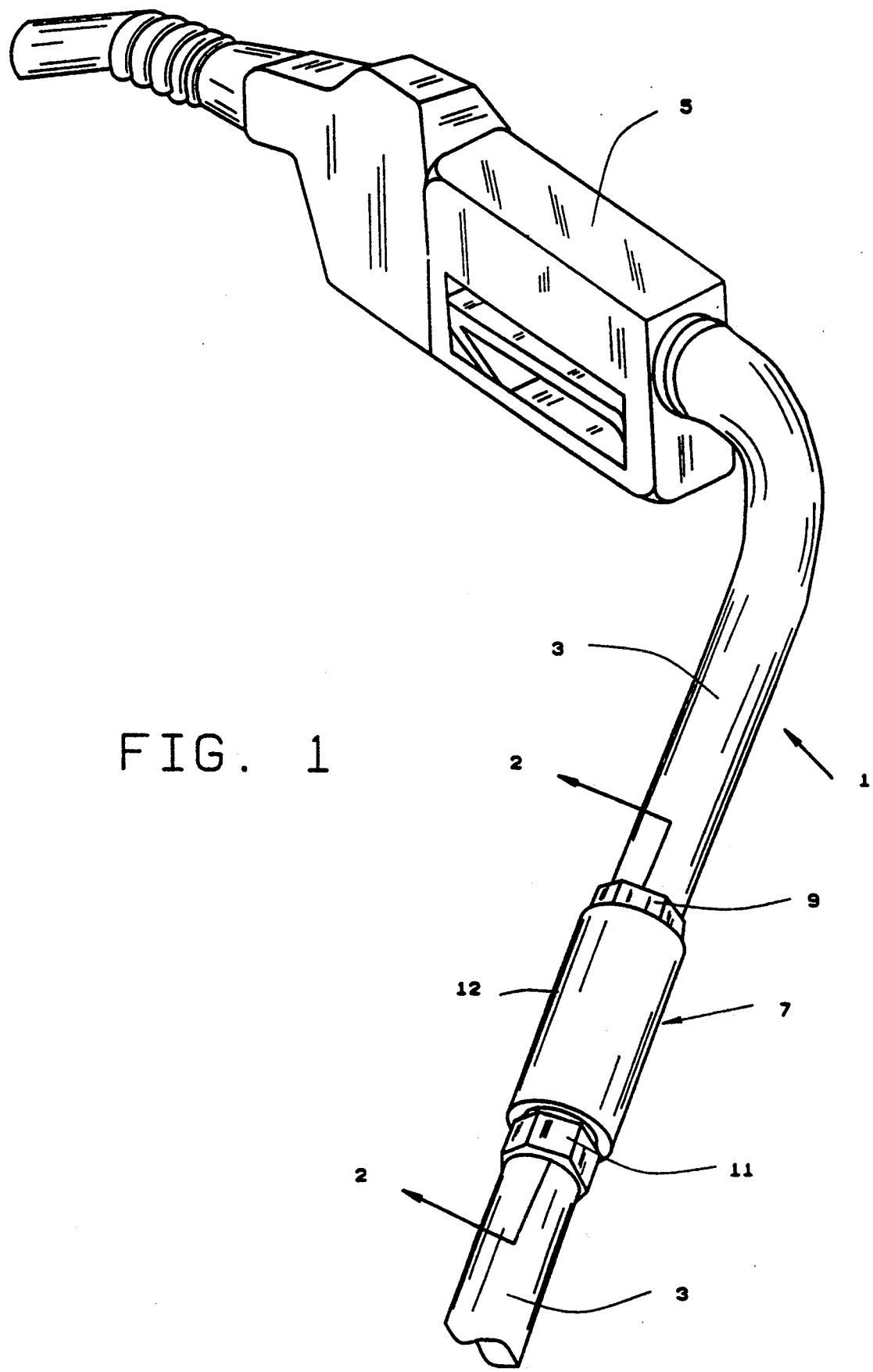
FIG. 1 is a perspective view of the break-away concentric hose coupling as employed in a fuel line having a hose section and a nozzle attached to the hose section.

Referring now to the drawings, a flexible fuel dispensing hose and nozzle system employing the present invention as indicated at FIG. 1 by reference character 1. The fuel dispensing hose 3 has a dispensing nozzle 5 at one end and is connected at the other extreme end to a fuel source such as a tank or a conventional gasoline pump (not shown).

Nozzle 5 is of a standard type known in the industry incorporating stage II vapor recovery features, and is designed to dispense fuel such as gasoline into a container such as the gasoline tank of an automobile or into a gasoline can, etc. In this particular embodiment, the nozzle is of the type that has the vapor recovery mechanism internal and is designed to be used with a flexible concentric fuel hose which has the vapor recovery portion of the fuel hose concentric to the fuel flow portion of the fuel hose.

The pressure compensating break away hose coupling of the present invention is shown generally at 7. Coupling 7 can be mounted in a hose 3 at any convenient site on hose 3, or coupling 7 can be attached to a nozzle. When coupling 7 is attached to a hose 3 or nozzle 5 with first fitting 9 and second fitting 11, coupling 7 is designed to be used with what is referred to in the industry as a concentric or "European" style vapor recovery hose wherein the vapor return passageway is inside the hose and internal of the fuel passageway. It is just as likely that the vapor and fuel paths could be interchanged.

The internal elements of the coupling of the present invention are best illustrated in FIGS. 2 and 3, with FIG. 2 illustrating the construction or relationship of the elements of coupling 7 in a coupled arrangement, and FIG. 3 illustrates the construction of the elements of coupling 7 when decoupled.

Referring to FIG. 2, a first fitting 9 includes a nut-like member 10 which incorporates internal threads, as at 13, to provide for the threaded engagement onto one of a nozzle, or a fuel line leading to a nozzle. Member 10 includes a forward extension 14 which is designed to fit within sleeve 12 but yet having limited slidability within sleeve 12, in a manner to be described hereinafter. Forward extension 14 has internal walls 15 formed therein to provide a valve seat for seating a poppet valve when the coupling is separated as will be described below and internal walls 19 of forward section 14 also define a fuel passageway 21.

Spider mount 16 having a plurality of fins 20 is housed in member 10. Spider 16 is stationarily fixed within member 10 and provides a means for supporting check valve 18 within the fitting. Check valve 18 contains an integral sleeve 22, which slides on spider sleeve 24, the interior of which defines vapor flow path 25. A spring 23 surrounds spider sleeve 24 and biases against the back surface of valve 18 thereby normally biasing the check valve 18 forwardly within fitting 9. Check valve 18 has circular recess 70 formed therein and disposed to receive forward elongate stem 60 of check valve 54 which is housed in fitting 11 as will be explained in detail below. An "O"-ring 26 mounts upon the surface of valve 18 to provide a sealed closure when check valve 18 seats against valve seat 15. "O"-ring 28 is mounted inside valve 18 to provide a seal against elongate stem 60 of valve 54.

Sleeve 22 of valve 18 contains a vapor passage opening 71 disposed to open into vapor chamber 25 formed concentrically in spider 16. Vapor chamber 25 is disposed to align with the vapor return passage orifice of a concentric flexible fuel hose (not shown) when such a fuel hose for the nozzle is attached to fitting 9. The outer portion of the concentric fuel hose (not shown), through which the fuel passes, is alignable with the finned portion of spider 16 so as to allow fuel to flow through fins 20 as will be subsequently described. A seal, such as O-ring 72 is provided between sleeves 24 and 22 to prevent passage of fluid therethrough.

Forward member 14 includes a series of apertures as at 30 and each aperture is designed for holding a detent ball 32 which may be fixed within the aperture by means of peening or other structural holding means, but yet provides for limited radial movement of the balls 32 between detent or latch ring 33 engaging holding positions wherein first fitting 9 is held within sleeve 12, but when the balls are freed inwardly or fitted internally thereof, upon release from ring 33, providing for disconnection. Detent balls 32 may be adjustably biased outward by conventional means so that the bias tension is adjustable and can be pre-determined. As shown in FIG. 2, detent balls 32 are disclosed, in this particular embodiment, seated within a detent groove 34 that is formed around the inner perimeter of sleeve 12. The spring 35 holds the latch ring 33 in place.

As also disclosed in FIGS. 2 and 3, a second fitting 11 includes a nut-like member 36 having a series of internal threads located therein as at 38, which are likewise designed for providing a connection of member 36 to an opposite extending concentric hose having a vapor passageway internal to the fuel passageway, or to attach to a nozzle as previously described. Member 11 fits securely inside sleeve 12 and is affixed to sleeve 12 by appropriate means such a secure friction fit or weld as shown at 39. Member 36 also includes forward extension 40, a further integrating shoulder 42 is provided forwardly of extension 40 and integrally connected forwardly thereof is another extension 44. A series of pre-loaded wave or disc springs 45 designed for arrangement upon extension 44 biased between the stationary means or rings 41 and 41A forming chamber 43. Chamber 43 forms a supplemental fluid pressure chamber and is designed to equalize and balance the forces generated within the coupling, so as to prevent inadvertent or untimely disconnection of the coupling when sudden internal pressure or "water hammer" may develop within the fuel hose, and its coupling. This pressure compensating mechanism is fully disclosed in U.S. Pat. No. 4,827,977, to Fink and is hereby incorporated by reference.

Internal inclined wall 46 of forward extensions 40 and 44 define a fuel passageway 48 and valve seat 47. Fuel passageway 48 within fitting 11 cooperatively abuts with fuel passageway 21 of fitting 9.

Spider mount 50 having a plurality of fins 52 on one end is stationarily fixed within extension 40, by means of the retaining ring 73, as shown. Spaces (not shown) between fins 52 cooperate with fuel passageway 48. With this arrangement, a fuel path is created so that fuel from a concentric hose connected at nut-like member 11 can flow through fins 52, through fuel passageway 48 and 21, through the spaces between fins 20 and out through a nozzle or another section of concentric hose attached at nut-like member 10.

Spider 50 provides a means for support of check valve 54 within fitting 11. Check valve 54 contains an integral sleeve 56 which is disposed for slidably fitting upon spider sleeve 51 of spider 50. Valve 54 has "O"-ring 55 located thereon to seal when valve 54 seats against valve seat 47. Sleeve 56 contains an O-ring 57 to prevent leadage of fluid between the sleeves 56 and 51. A vapor chamber 59 is formed concentrically within spider 50. A spring 58 surrounds support sleeve 51 and biases against the back surface of check valve 54 thereby usually biasing check valve 54 forwardly within fitting 11.

Check valve 54 contains forward elongate cylinder 60 which extends integrally away from check valve 54 and through fuel passage 48 to seat in circular recess 19 in check valve 18 and within its fitting 9 as previously explained. The walls of elongate cylinder 60 define a vapor flow pathway 62 that is cooperatively connected with vapor flow path 25 of check valve 18, and also vapor chamber 59. When assembled, therefore, a continuous vapor flow pathway is thus formed centrally through the coupling. A concentric hose is attached to fitting 11 as previously described; the inner concentric portion or vapor recovery portion of the hose fits snuggly to vapor chambers, and more specifically within chamber 59. An appropriate nozzle, i.e., one designed to accommodate a concentric fuel line, is mounted on fitting 9, the vapor collection system of that nozzle snuggly fitted to vapor chamber 25 of spider 16, thereby creating a continuous vapor recovery pathway from the nozzle, through chamber 25, centrally through passageway 62, into passageway 59, and out through the inner concentric portion of any hose attached to fitting 11.

FIG. 3 illustrates the relationship of the elements of the coupling device of the present invention when the device is decoupled. When excessive tension is exerted on the hose bearing the coupling, the coupling is designed to decouple and to avoid any breakage of the fuel line and to avoid any leakage of fuel or vapors through the decoupled system.

As can also be seen in FIG. 2, a fine wire retention means 73 is seated within the groove within the central opening of the check valve 54, and the wire extends outwardly, as noted, for connection with a further check valve 74. Check valve 74 has an O-ring 75 provided around it, and which is designed for seating upon or in the canted valve seat 76 provided within the spider sleeve 51, as noted. Thus, when the break-away coupling is inadvertently disconnected, as when a vehicle drives away from the fuel dispenser, yet with the fluid nozzle still disposed within its vehicle tank, this check valve 74 is moved forwardly, within the sleeve 51, and pulled in this direction by means of the valve 54 being urged by its spring 58 also forwardly, until such time as the check valve 74 sealingly comes to rest upon the valve seat 76, so as to close off and curtail the escape of any accumulated vapors, that had been returned back to the underground fuel storage tank, from escaping out of the coupling, at this location. A check valve of this type is not provided at the opposite end of the stem 60, because the minor vapors remaining within the vehicle fuel tank, which may escape back through the nozzle, and out of the coupling, at the opposite end, are minuscule, compared to the disruption caused by the breakage of the fuel line, through disconnection of this breakaway coupling, due to the inadvertent drive off of the vehicle. The seating of the check valve 74 within the sleeve 51 can be noted in FIG. 3, where the coupling is disclosed separated.

Upon exertion of force, detent balls 32 become disengaged from detent groove 34. The amount of tension required to decouple the device can be pre-determined as previously explained in the detent system used to establish the tension force under which the device will be coupled.

When the pre-determined tension force is exceeded, fitting 9 slides out of sleeve 12; instantaneously spring 23 biases check valve 18 against valve seat 15 with "O"-rings 26 sealing between valve and valve seat thereby closing off the fuel passageway 21. Thus, fuel cannot back flow out of the connected nozzle. Correspondingly within fitting 11, bias spring 58 urges check valve 54 to seat upon valve seat 47 with "O"-ring 55 sealing between the valve and valve seat thereby blocking off fuel passageway 48. An addition, valve 74 seats upon valve seat 76 to block the escape of collected vapors, since the extent of its movement is determined by the seating of 54 upon seat 47.

To reassemble the coupling, fitting 9 is slid into sleeve 12 until detent balls 32 push back the ring 33 and engage and lock in detent grooves 34. Extension stem 60 of valve 54 engages valve 18 at chamber 19 and bias springs 58 and 23 cooperatively compress and urge the respective valves away from their respective valve seats thereby opening the fuel passageway. Likewise, valve 74 is urged off of its seat 76, to reopen through the vapor passageways 25, 62, and 59. Ring 78 pushing against valve 18 causes this movement.

Thus this invention provides means for functioning as a break away hose coupling to prevent untimely spillage when a disconnection of the coupling occurs within a flexible concentric fuel line. In addition, as previously described, the internal pressure generated within the fuel line is balanced to prevent untimely break away or uncoupling of the device.

Variations and modifications to the subject matter of this invention may occur to those skilled in the art upon review of the disclosure provided herein. Such variations or modifications, if within the spirit of this invention, are intended to be encompassed within the scope of any claims to patent protection issuing upon this invention. The description of the preferred embodiment, set forth herein, in addition to the drawings, are provided for illustrative purposes only.

Having thus described the invention, what is claimed and desired to be secured by Letters patent is:

1. In a break-away coupling to be mounted in a flexible fuel line between the fuel source and the fuel dispensing nozzle of the type that allows fuel flow therethrough during usage but capable of disconnecting and shutting off flow through the line when subject to excessive tensioning force exerted on the line comprising:

a first fitting of generally cylindrical shape connectable to said nozzle or one section of fuel line leading to a nozzle;

a second fitting of generally cylindrical shape connectable to the other section of fuel line;

said first and second fittings forming a fuel flow passage therein and an inner disposed concentric vapor return passage;

said first and second fittings each having a check valve, said valves being opposed to each other, one of said valves having an extension therewith, and disposed for engaging the other valve during coupling to hold said valves unseated from their respective valve seats to allow fluid and vapors to flow through the coupling, and disposed to retract and allow said valves to seat on their respective valve seats thereby shutting off flow through the coupling when the coupling is severed;

said first and second fittings having finned spider means connector mounts of generally cylindrical shape, for securing the check valve to the fittings, said spider means connector mounts disposed to allow fluid flow through the said spider means connector mounts and to allow vapors to flow out through the inner concentric passage;

said engaged check valve each having cooperating internal vapor passages, said vapor passages internal to the fluid flow passage, said vapor passages being cooperatively connected with said respective spider means connector mounts to allow vapor to flow through said device and out through the fuel line;

said first and second fittings being slidably connected within a sleeve, said fittings being held together in said sleeve by detent means, said detent means being disposed to release upon application of predetermined tensioning force; and a further check valve means disposed within the vapor passage to prevent the escape of collected vapors from the second fitting when the breakaway coupling disengages.

2. The apparatus of claim 1 wherein the spider means connector mount of the first and second fittings are designed to cooperatively connect with a concentric fluid hose wherein the vapor flow means is internal to the fluid flow means.

3. The invention of claim 1 wherein the detent means is adjustable so as to disconnect at a pre-determined established tension.

4. The apparatus of claim 1 wherein the coupling mechanism is reconnectable.

5. A fluid coupling for connecting two fluid line sections comprising:
- a first fitting of generally cylindrical shape connectable to one section of fluid flow line;
- a second fitting of generally cylindrical shape connectable to the other section of fluid flow line;
- said first and second fittings being slidably connected within a sleeve, said fittings being held together by a detent means, said detent means being disposed to release upon exceeding a pre-determined tensile force;
- said first and second fittings forming a fuel flow passage and an innerdisposed concentric vapor return passage;
- said first and second fittings having check valves, each fitting having a valve seat for the seating of its respective check valves after decoupling, one of said check valves having an extension therewith, and disposed for encountering the other check valve means during coupling to hold the check valves unseated from their respective valve seats and allowing fluid and vapors to pass through the concentric flow lines and the coupling during normal usage;
- said first and second fittings having connector mounts for securing said check valves to the fittings, said spider connectors disposed to allow fluid flow therethrough, and disposed to allow vapor flow through the said inner concentric passage;
- said valves having cooperating internal vapor passages, said vapor passages cooperatively connected to said inner concentric passage of each connector mount to allow vapors to flow through said vapor passage and out through said spider connector concentric section;
- means for blocking said flow of fluid and vapors through such coupling when such coupling is decoupled; and
- a chamber formed between said sleeve and said fittings and disposed for the reception therein of fluid from the flow line to provide for equalization of fluid forces generated within the coupling device during routine fluid flow to prevent premature decoupling and leakage from the hose coupling.

6. The invention of claim 5 wherein said connector mount comprising thinned spider connector mounts.

7. The apparatus of claim 6 wherein the said first and second fittings are connectable to a concentric hose of the European style in which the vapor flow chamber is internal to the fluid flow chamber.

8. The invention of claim 6 wherein the detent means can be adjusted to allow separation of the coupling upon a predetermined established tension force.

9. The apparatus of claim 6 wherein the coupling can be reassembled after separation.

10. The invention of claim 6 wherein the tension force required for disconnection of the first and second fittings within the said sleeve being variable through the adjustment of a preloaded spring.

11. The invention of claim 6 wherein the relatch force for regulating the reconnection of the break-away coupling being variably adjusted by means of a latch spring.

12. A break-away hose coupling for use in a fuel dispensing hose comprising:
- a sleeve means;
- first and second fittings, said fittings being slideably connected within said sleeve, said fittings being held together within said sleeve by a detent means, said detent means being disposed to release upon a predetermined established tensioning force;
- said fittings each containing a valve means;
- said valve means disposed to be open and allow flow through the coupling when the fittings are connected and disposed to seat in their respective valve seats to prevent flow through the coupling when the fittings are disconnected;
- a fluid flow passage;
- a vapor flow passage, said vapor flow passage being internal to the fluid flow passage thereby allowing the coupling to be mounted on a coaxial hose wherein the vapor flow passage is internal to the fluid flow path; and
- means provided in one of said fittings for blocking said vapor flow passage when the coupling is severed thereby preventing the escape of vapors into the atmosphere.

13. The invention of claim 12 wherein an elongated cylinder connecting to one of said fittings, said elongated cylinder being removably connected with the other of said fittings, and a further check valve connecting with said elongated cylinder and disposed for mounting within a valve seat to shut off the flow of vapors when the break-away coupling disconnects.

14. The invention of claim 13 and including a support means fixing said check valve axially disposed from one end of said elongated cylinder.

* * * * *